United States Patent
Spencer et al.

(10) Patent No.: US 7,435,052 B2
(45) Date of Patent: Oct. 14, 2008

(54) SHAFT OIL PURGE SYSTEM

(75) Inventors: Doug K. Spencer, Mesa, AZ (US);
Mohsiul Alam, Chandler, AZ (US);
Mingfong F. Hwang, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 576 days.

(21) Appl. No.: 11/134,177

(22) Filed: May 20, 2005

(65) Prior Publication Data

US 2006/0267290 A1 Nov. 30, 2006

(51) Int. Cl.
*F01D 25/16* (2006.01)
(52) U.S. Cl. .................................. 415/229; 416/126
(58) Field of Classification Search .................. 415/68, 415/69, 111, 112, 115, 116, 174.4, 174.5, 415/229, 230; 416/124, 126
See application file for complete search history.

(56) References Cited

U.S. PATENT DOCUMENTS

| | | | | |
|---|---|---|---|---|
| 930,851 A | * | 8/1909 | De Ferranti | ................ 415/111 |
| 3,558,236 A | * | 1/1971 | Bylsma | ..................... 415/55.1 |
| 4,452,037 A | | 6/1984 | Waddington et al. | |
| 4,542,623 A | | 9/1985 | Hovan et al. | |
| 4,754,983 A | | 7/1988 | Kruger | |
| 5,028,205 A | | 7/1991 | Kapadia et al. | |
| 5,211,535 A | * | 5/1993 | Martin et al. | ............ 415/170.1 |
| 5,301,957 A | * | 4/1994 | Hwang et al. | ................ 277/350 |
| 5,593,165 A | * | 1/1997 | Murray et al. | ............... 277/543 |
| 5,913,812 A | * | 6/1999 | Smith et al. | .................... 60/657 |
| 6,125,624 A | | 10/2000 | Prociw | |
| 6,170,453 B1 | | 1/2001 | Killion | |
| 6,325,382 B1 | | 12/2001 | Iwamoto et al. | |
| 6,330,790 B1 | * | 12/2001 | Arora et al. | ................ 60/39.08 |
| 6,435,822 B1 | * | 8/2002 | Kobayashi et al. | ........ 415/172.1 |
| 6,609,888 B1 | | 8/2003 | Ingistov | |
| 6,619,908 B2 | * | 9/2003 | Bruno et al. | .................... 415/1 |
| 6,655,657 B2 | | 12/2003 | Bircann | |
| 6,976,679 B2 | * | 12/2005 | Goss et al. | ................... 277/347 |
| 7,175,388 B2 | * | 2/2007 | Labbe et al. | ............. 415/174.5 |
| 2006/0191268 A1 | * | 8/2006 | Widener et al. | ............... 60/772 |

* cited by examiner

*Primary Examiner*—George Nguyen
*Assistant Examiner*—Aaron R Eastman
(74) *Attorney, Agent, or Firm*—Ingrassia, Fisher & Lorenz, P.C.

(57) ABSTRACT

A shaft oil purge system comprises an entrance seal, an exit seal and a buffer air flow. The entrance seal comprises a circumferential carbon seal running on an inner shaft and another carbon seal running on an outer shaft. The exit seal comprises a labyrinth seal positioned on the inner shaft and towards the exit end of the annulus between the shafts. An abradable material filled groove positioned radially outward from the exit seal allows the inner shaft to rub without compromising the integrity of the outer shaft. The buffer air flow enters the annulus from a cavity at the entrance seal, purges oil from the annulus and improves the efficiency of the seals.

33 Claims, 4 Drawing Sheets

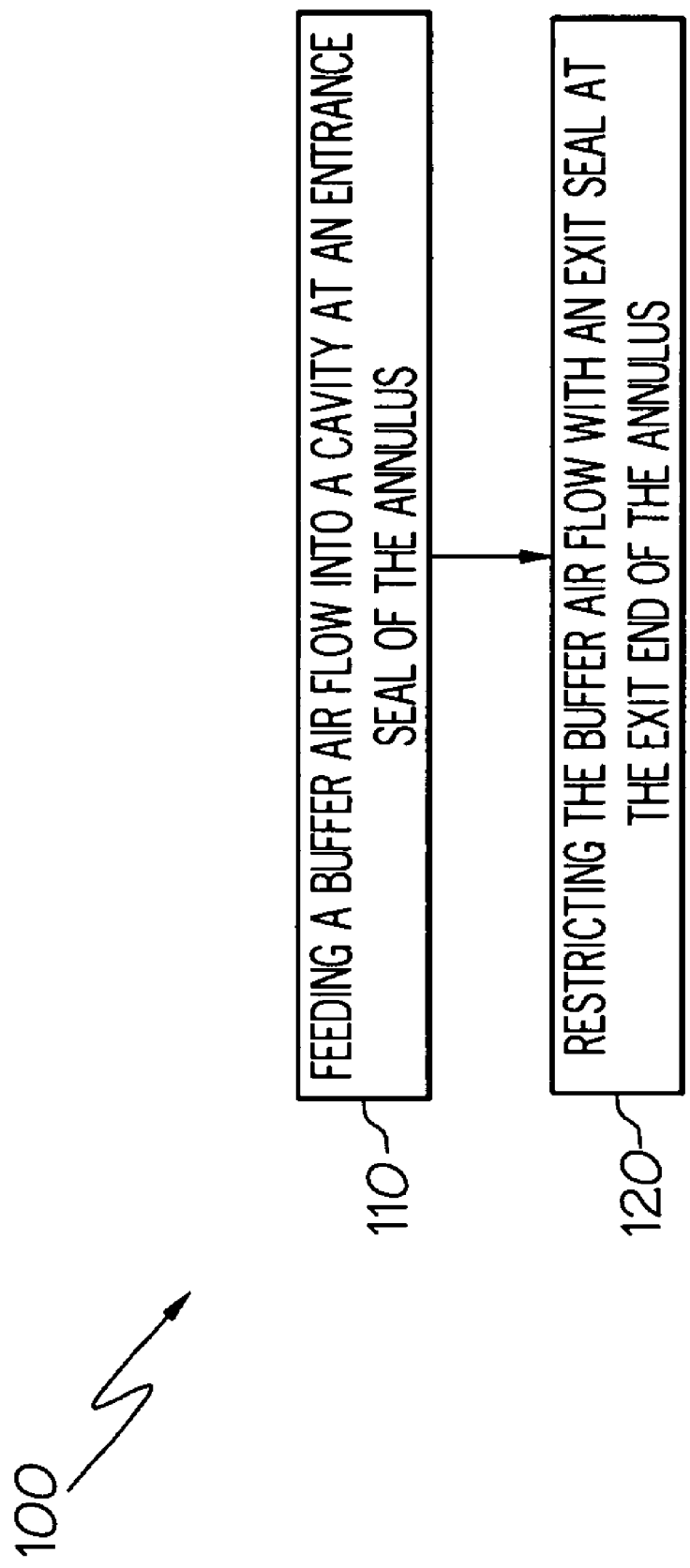

SHAFT OIL PURGE SYSTEM

BACKGROUND OF THE INVENTION

The present invention generally relates to a turbomachine and, more particularly, to a system and apparatus that restricts oil transfer from rotating component sumps into the annulus between the rotor shafts of a turbomachine.

A turbomachine may include rotating components such as a fan, a compressor, and a turbine. A rotor shaft clamps the rotating components, forming a rotor group. Two or more bearing assemblies support the rotor group. The bearing assemblies are surrounded by support housings connected to the engine case. Various sealing apparatus are used to retain oil within the bearing compartments.

Some turbomachines include two or more coaxial rotor shafts, for example a high pressure turbine (HPT) shaft and a low pressure turbine (LPT) shaft. Oil from a rotating component sump may enter the annulus between the shafts, resulting in coked oil build up on the inner diameter (ID) of the outer shaft and on the outer diameter (OD) of the inner shaft. Because the shafts are rotating, the coked oil build up on the ID of the outer shaft can rub the OD of the inner shaft resulting in the cutting of the inner shaft. The shaft in-situ machining can lead to a cut/separated shaft and an engine in flight shut down. For some applications, the coked oil build up is due to air pressure differentials between the two rotating component sumps and further exasperated by high operating and soak back temperatures. Various sealing apparatus have been used to restrict oil passage and reduce coked oil build up.

U.S. Pat. No. 4,754,983 provides a sealing system for a gas turbine engine. The system includes two rings surrounding the inner shaft. The rings are pivotally connected to a housing mounted on the outer shaft. The pivot axes of the rings are 180° apart from each other. Under the action of centrifugal force during rotation of the outer shaft, the rings pivot laterally towards the surfaces of the housing to take up outer circumferential clearances. The described sealing system may restrict oil passage at the forward end of the annulus between the shafts. For some applications, a means to restrict oil passage at the exit (aft end) of the annulus is also needed. Additionally, the described system does not provide a means to purge the oil should it enter the annulus.

U.S. Pat. No. 5,211,535 provides a labyrinth seal for a gas turbine engine. The described seal includes a cylindrical sleeve and a plurality of annular seal teeth. The sleeve is attached to and distinct from the outer shaft, which prevents stress cracks created in the region of the seal teeth from propagating to the outer shaft. The seal teeth extend radially inwardly to the inner shaft, forcing fluid trapped in the seal along the inner shaft. Although the sleeve may facilitate seal maintenance and the teeth may improve seal efficiency for some applications, the described seal has high air leakage and does not provide a means to restrict oil passage at the exit of the annulus.

As can be seen, there is a need for an improved sealing system for restricting oil passage into the annulus between two shafts. Additionally, a system is needed that provides a means to purge oil from the annulus should oil enter the annulus.

SUMMARY OF THE INVENTION

In one aspect of the present invention, an assembly for a cavity between an inner shaft and an outer shaft comprises an entrance seal positioned towards the forward end of the cavity; and a buffer air flow fed into the entrance seal.

In another aspect of the present invention, an assembly for an annulus between an inner shaft and an outer shaft comprises a first circumferential carbon seal running on an outer diameter of the inner shaft; a second circumferential carbon seal running on an outer diameter of the outer shaft; a labyrinth seal positioned towards an aft end of the annulus; and a buffer air flow fed into a cavity between the first circumferential carbon seal and second circumferential carbon seal.

In still another aspect of the present invention, an assembly for an aircraft engine comprises an inner shaft seal running on an outer diameter of a low pressure turbine shaft of the aircraft engine; an outer shaft seal running on an outer diameter of a high pressure turbine shaft of the aircraft engine; an exit seal positioned towards an aft end of an annulus between the high pressure turbine shaft and the low pressure turbine shaft, the exit seal positioned on the low pressure turbine shaft; an abradable material filled groove positioned on the high pressure turbine shaft and radially outward from the exit seal; and a buffer air flow fed into a cavity between the inner shaft seal and the outer shaft seal.

In yet another aspect of the present invention, an assembly for sealing a forward end of an annulus between an inner shaft and an outer shaft comprises an inner shaft seal running on an outer diameter of the inner shaft; an outer shaft seal running on an outer diameter of the outer shaft; and a buffer air flow fed into a cavity between the inner shaft seal and the outer shaft seal.

In another aspect of the present invention, an assembly for an annulus between an inner shaft and an outer shaft comprises an entrance seal having a first circumferential carbon seal and a second circumferential carbon seal, the entrance seal having an initial built radial clearance of less than about 0.005 inches, the first circumferential carbon seal running on an outer diameter of the inner shaft and positioned towards a forward end of the annulus, the second circumferential carbon seal running on an outer diameter of the outer shaft and positioned towards the forward end; a labyrinth seal positioned on the outer diameter of the inner shaft and towards an aft end of the annulus, the labyrinth seal having an initial built radial clearance of between about 0.002 inches and about 0.020 inches; a groove positioned on the inner diameter of the outer shaft and radially outward from the labyrinth seal, the groove filled with a silver material having a radial thickness of between about 0.005 inches and about 0.040 inches; and a buffer air flow fed into a cavity between the first circumferential carbon seal and the second circumferential carbon seal.

In a further aspect of the present invention, a method of purging oil from an annulus between an inner and an outer shaft comprises the steps of feeding a buffer air flow through an entrance seal of the annulus; and restricting the buffer air flow with an exit seal at the exit end of the annulus.

These and other features, aspects and advantages of the present invention will become better understood with reference to the following drawings, description and claims.

BRIEF DESCRIPTION OF THE DRAWINGS

FIG. 4 is a flow chart of a method of purging oil from an annulus according to one embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides shaft oil purge systems for gas turbine engines. The shaft oil purge systems according to the present invention may find beneficial use in many industries including aerospace, marine, automotive, and electricity generation. The present invention may be beneficial in applications including manufacturing and repair of aerospace components. This invention may be useful in any dual shaft oil lubricated machine and any two spool gas turbine engine application.

In one embodiment, the present invention provides a shaft oil purge system for a gas turbine engine. The shaft oil purge system may comprise a tandem seal package at the entrance to the annulus between two rotor shafts connected to rotating component sumps. Unlike the prior art, the tandem seal package may comprise two identical circumferential carbon seals, one riding on the OD of the outer shaft and the other riding on the OD of the inner shaft. Engine or external air may be fed into the tandem seal package and into the annulus, which is also unlike the prior art. The air flow of the present invention may reduce the coked oil build up due to air pressure differentials between the two rotating components sumps. The present invention may further comprise a exit seal element, such as a labyrinth seal, on the OD of the inner shaft at the exit of the shaft annulus to further minimize oil flow and resultant coke build up. To allow the inner shaft to deflect during adverse operating conditions and to minimize the exit seal element clearance, a groove filled with abradable material may be provided on the ID of the outer shaft at a position radially outward from the exit seal element.

Figure 1:
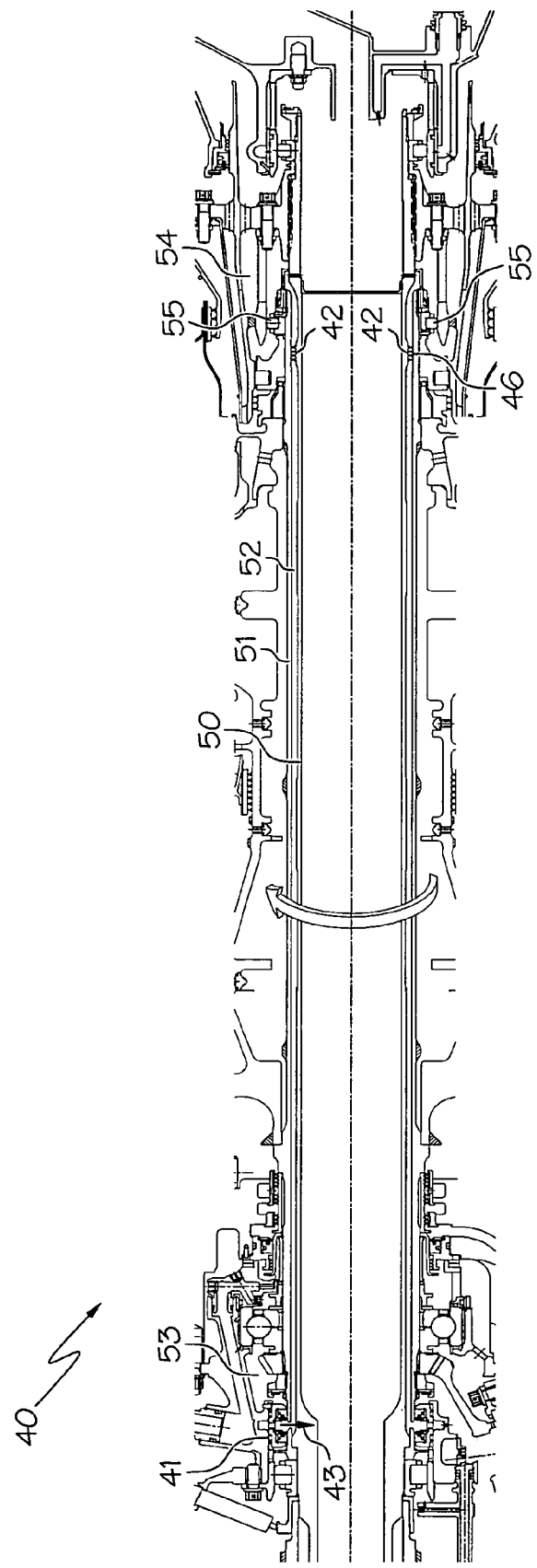
FIG. 1 is a cross-sectional view of a shaft oil purge system according to one embodiment of the present invention.

A shaft oil purge system 40 according to an embodiment of the present invention is shown in FIG. 1. The system 40 may comprise an entrance seal 41, an exit seal 42 and a buffer air flow 43. The buffer air flow 43 may pass into a cavity 60 between the two components of the entrance seal 41 and enter an annulus 52. The annulus 52 may be an annular shaped cavity between an inner shaft 50 and an outer shaft 51. The annulus 52 may be between and in flow communication with a forward sump 53 and an aft sump 54. The buffer air flow 43 may flow downstream through the annulus 52 towards the exit seal 42. The buffer air flow 43 may purge oil from the annulus 52 as it exits the annulus 52. For some applications, a groove 46 may be formed on the ID of the outer shaft 51. The groove 46 may be filled with an abradable material (not shown).

Figure 2:
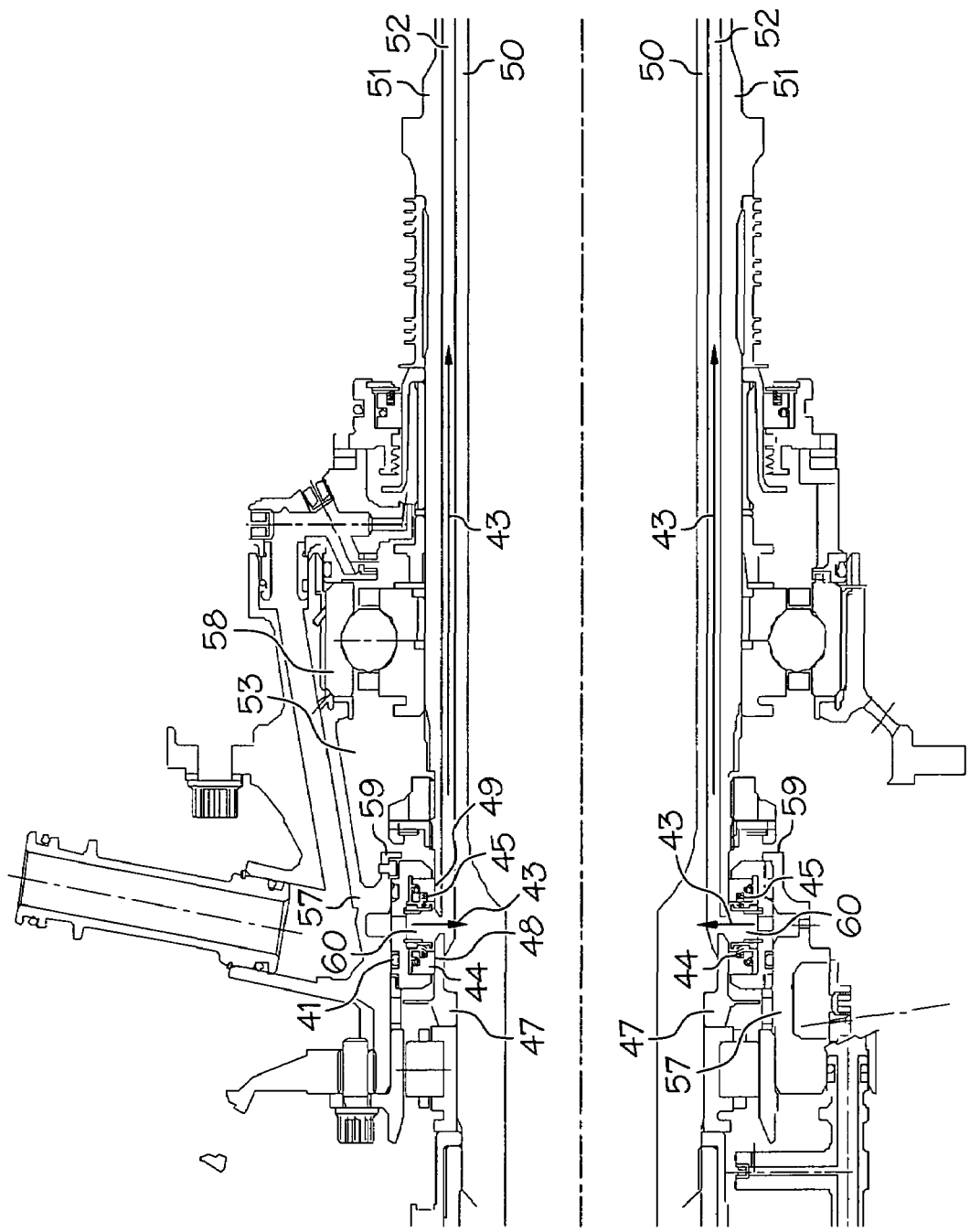
FIG. 2 is a close up view of the forward end of FIG. 1.

The entrance seal 41, as better seen in FIG. 2, may comprise an inner shaft seal 44 running on the inner shaft 50 and an outer shaft seal 45 running on the outer shaft 51. For some applications, the inner shaft 50 may comprise a low pressure turbine shaft and the outer shaft 51 may comprise a high pressure turbine shaft. The entrance seal 41 may be positioned towards the forward end of the annulus 52. For some applications, the entrance seal 41 may be mounted on a bearing support housing 57. The buffer air flow 43 may pass into the cavity 60 between the inner shaft seal 44 and the outer shaft seal 45.

The inner shaft seal 44 may run directly on the OD of the inner shaft 50. Alternatively, the inner shaft seal 44 may run on an inner shaft runner 47 mounted on the inner shaft 50, as depicted. As used herein, running on a shaft may comprise either running directly on the shaft or running on a runner mounted on the shaft. The inner shaft runner 47 may have a coating material (not shown), such as chrome, at an inner seal interface 48. The inner seal interface 48 may be the interface between the inner shaft seal 44 and the inner shaft runner 47. For some applications, the inner seal interface 48 may be the interface between the inner shaft seal 44 and the inner shaft 50. The outer shaft seal 45 may run directly on the OD of the outer shaft 51, as depicted. The outer shaft 51 may have a coating material, such as chrome, at an outer seal interface 49. The outer seal interface 49 may be the interface between the outer shaft 51 and the outer shaft seal 45. In an alternate embodiment, the outer shaft seal 45 may run on an outer shaft runner (not shown), and the outer seal interface 49 may comprise the interface between the outer shaft seal 45 and the outer shaft runner. For some applications, other coating materials such as tungsten carbide and chromium carbide may be used in lieu of chrome at the inner and outer seal interfaces 48,49. For some applications, axial movement of the entrance seal 41 (i.e. seals 44 and 45) may be restrained by a housing flange 59 and a #2 roller bearing outer race 58.

The inner and outer shaft seals 44,45 may each comprise a conventional circumferential carbon seal. Circumferential carbon seals may be segmented carbon rings held together by garters or retainer springs. Circumferential carbon seals may be available from various sources. The entrance seal 41 may comprise two identical seal assemblies installed in the opposite direction, a back-to-back arrangement, with one seal sealing on the inner shaft 50 and the other sealing on the outer shaft 51.

The entrance seal 41 may comprise a segmented archbound ring design. For some applications, the entrance seal 41 may be adapted to have an initial built radial clearance of less than about 0.005 inches. The radial clearance may be the distance between the runner/shaft and the entrance seal 41. Considering the carbon thermal growth and centrifugal and thermal growth of the runner/shaft, the entrance seal 41 for some aircraft applications may be designed to operate at line-to-line at sea level take off, and thereby limit the buffer air flow 43 into the forward sump 53. At other operating conditions within the flight envelope, the entrance seal 41 may be designed to operate as a clearance seal with non-contacting long life operation.

Figure 3:
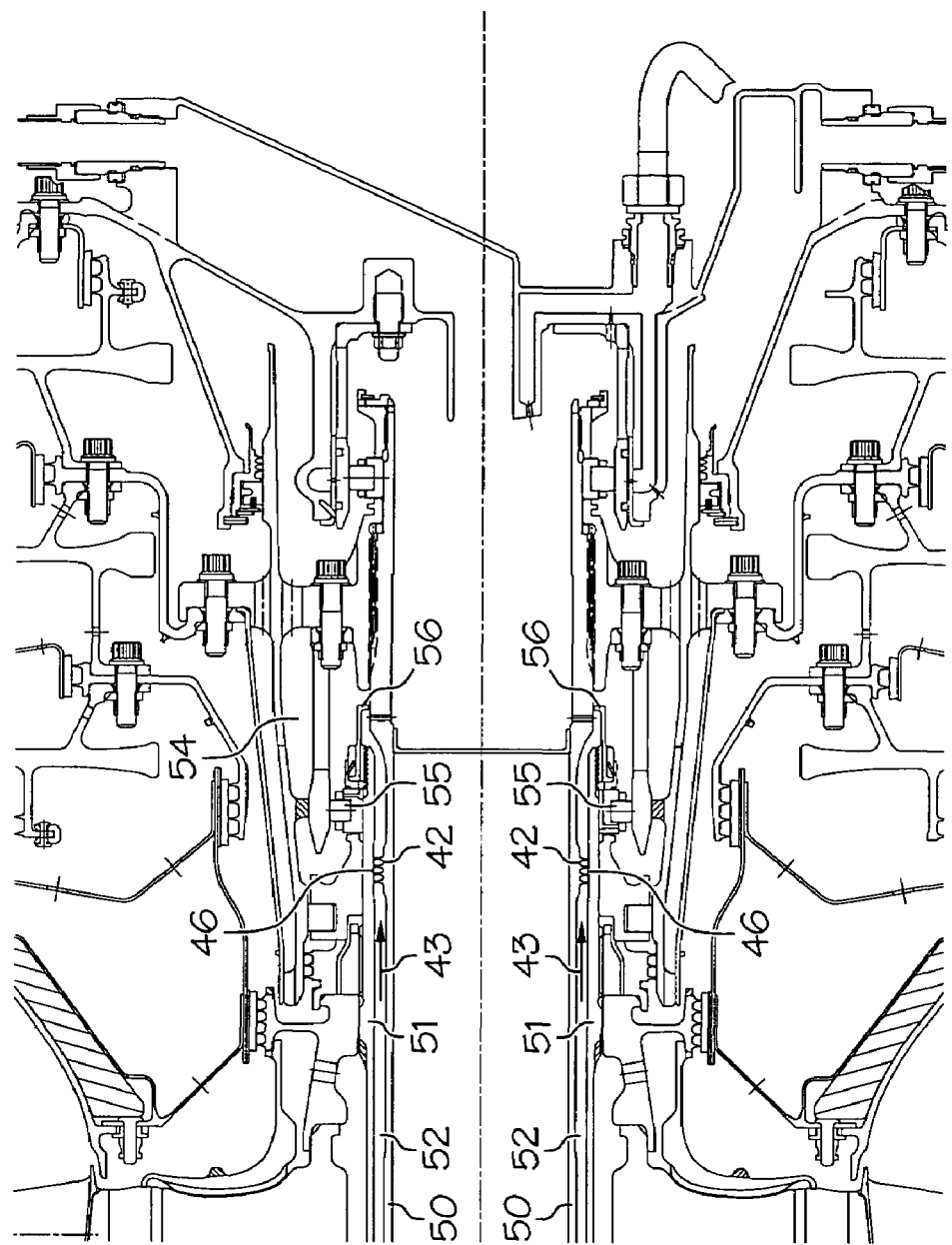
FIG. 3 is a close up view of the aft end of FIG. 1.

The exit seal 42, as better seen in FIG. 3, may comprise a conventional labyrinth seal. The exit seal 42 may be positioned towards the aft end of the annulus 52. The exit seal 42 may be positioned on the OD of the inner shaft 50 and towards the exit end of the annulus 52. The exit end (aft end) may be defined with reference to the direction of air flow though the annulus 52. The exit seal 42 may be positioned between the annulus 52 and the aft sump 54. For some applications, the exit seal 42 may be adapted to have an initial built radial clearance of between about 0.002 and about 0.020 inches. The exit seal 42 may improve the oil purging efficiency of the buffer air flow 43. A turbomachine that includes an oil scoop 56 to supply oil across the annulus 52 to an intershaft bearing 55 may further necessitate the optimization of the exit seal clearance and the buffer air flow 43. A close clearance between the exit seal 42 on the inner shaft 50 and the ID of the outer shaft 51 may be essential to minimize oil entrance into the annulus 52. Additionally, since the buffer air flow 43 used to purge the annulus 52 may impact turbomachine performance a minimum clearance may be desired.

The groove 46 may be provided to minimize exit seal clearance and allow the inner shaft 50 to deflect during adverse operating conditions. The groove 46 may be cut on the ID of the outer shaft 51 at a position radially outward from the exit seal 42. The groove 46 may be filled with abradable material (not shown), such as a silver material. For some applications the abradable material may include other abradable materials, for example an aluminum oxide material. Because the abradable material may produce debris (not shown) that can enter the rotating sumps during engine operation, silver may be preferred for some applications. The abradable material may allow the inner shaft 50 to rub without compromising the integrity of the outer shaft 51. For some applications, the radial thickness of the abradable material may be between about 0.005 inches and about 0.040 inches.

The buffer air flow 43 may comprise engine or external air. The buffer air flow 43 may be fed into the cavity 60 between the two components of the entrance seal 41, between the inner shaft seal 44 and the outer shaft seal 45. In order to minimize the volume of buffer air flow 43, the pressure of the buffer air flow 43 may be reduced by a controlling orifice (not shown) located inside an air transfer tube (not shown). The air transfer tube may be between and in flow communication with the entrance seal 41 and a source of the buffer air flow 43. The buffer air flow 43 may increase the pressure within the annulus 52, thereby reducing the entrance of oil from the forward and aft sumps 53,54. The buffer air flow 43 may purge oil that does enter the annulus 52 by forcing the oil through the exit seal 42. A useful pressure of the buffer air flow 43 may depend on factors including application, operating conditions/temperatures and annulus dimensions. For example, for some aircraft turbine engine applications having a maximum buffer air flow temperature of about 300° F., the pressure of the buffer air flow 43 may be reduced to about 9 psi at maximum. For this example, the orifice may be sized by criterions including minimum of 0.5 psid across the entrance seal 41 at ground idle.

A method 100 of purging oil from an annulus between an inner and an outer shaft is depicted in FIG. 4. The method 100 may comprise a step 110 of feeding a buffer air flow into a cavity at an entrance seal of the annulus and a step 120 of restricting the buffer air flow with an exit seal at the exit end of the annulus. The step 110 may comprise feeding a buffer air flow 43 from a compressor inter-stage (not shown) through external tubing/plumbing (not shown) and a core passage inside the front frame (not shown) and two air transfer tubes (not shown), located inside a forward sump 53. The buffer air flow 43 may pass through a controlling orifice (not shown) inside the air transfer tube and into the annulus 52. The step 110 of feeding the buffer air flow 43 may comprise feeding an external air flow between two circumferential carbon seals. The step 110 of feeding the buffer air flow 43 may comprise feeding an engine air flow. The step 110 may comprise passing the buffer air flow 43 between an inner shaft seal 44 and an outer shaft seal 45. The step 120 may comprise forcing the buffer air flow 43 through a labyrinth seal positioned on the OD of the inner shaft 50. The step 120 may comprise forcing the buffer air flow 43 between an exit seal 42 on the inner shaft 50 and an abradable material filled groove 46 on the outer shaft 51. For some applications, the buffer air flow may be restricted by an orifice inside the air transfer tube and the exit seal 42 may control air velocity to effectively prevent oil inside aft sump 54 from entering the cavity (annulus) 52.

As can be appreciated by those skilled in the art, the present invention provides shaft oil purge systems for turbomachines. The seal arrangement of the present invention restricts oil passage and precludes making holes in the highly stressed outer shaft. The buffer air flow purges oil from the annulus of the rotating shafts, further reducing coked oil build up inside the annulus which can result in shaft cutting.

It should be understood, of course, that the foregoing relates to exemplary embodiments of the invention and that modifications may be made without departing from the spirit and scope of the invention as set forth in the following claims.

We claim:

1. An assembly for a cavity between an inner shaft and an outer shaft comprising:
   an entrance seal positioned towards the forward end of said cavity, said entrance seal including two circumferential carbon seals wherein one said circumferential carbon seal runs on an outer diameter of said inner shaft and one said circumferential carbon seal runs on an outer diameter of said outer shaft; and
   a buffer air flow fed into said entrance seal.

2. The assembly of claim 1, further comprising an exit seal positioned towards an aft end of said cavity.

3. The assembly of claim 2, wherein said exit seal comprises a labyrinth seal.

4. The assembly of claim 2, wherein said exit seal is positioned on said inner shaft.

5. The assembly of claim 1, further comprising a groove positioned towards an aft end of said cavity.

6. The assembly of claim 5, wherein said groove is positioned on said outer shaft.

7. The assembly of claim 5, wherein said groove is filled with an abradable material.

8. The assembly of claim 1, wherein said entrance seal has an initial built radial clearance of less than about 0.0005 inches.

9. The assembly for an annulus between an inner shaft and an outer shaft comprising:
   a first circumferential carbon seal running on an outer diameter of said inner shaft;
   a second circumferential carbon seal running on an outer diameter of said outer shaft;
   a labyrinth seal positioned towards an aft end of said annulus; and
   a buffer air flow fed into a cavity between said first circumferential carbon seal and said second circumferential carbon seal.

10. The assembly of claim 9, wherein said buffer air flow comprises an external air flow.

11. The assembly of claim 9, wherein said buffer air flow comprises an engine air flow.

12. The assembly of claim 9, wherein an outer seal interface between said second circumferential carbon seal and said outer shaft has a coating material.

13. The assembly of claim 9, wherein said labyrinth seal has an initial built radial clearance of between about 0.002 inches and about 0.020 inches.

14. The assembly of claim 9, wherein said labyrinth seal is positioned on said inner shaft and further comprising a groove filled with an abradable material positioned on said outer shaft and radially outward from said labyrinth seal.

15. The assembly of claim 14, wherein said abradable material comprises a silver material.

16. The assembly of claim 14, wherein said abradable material comprises a silver material.

17. The assembly for an aircraft engine comprising:
   an inner shaft seal running on an outer diameter of a low pressure turbine shaft of said aircraft engine;
   an outer shaft seal running on an outer diameter of a high pressure turbine shaft of said aircraft engine;
   an exit seal positioned towards an aft end of an annulus between said high pressure turbine shaft and said low pressure turbine shaft, said exit seal positioned on said low pressure turbine shaft;

an abradable material filled groove positioned on said high pressure turbine shaft and radially outward from said exit seal; and a buffer air flow fed into a cavity between said inner shaft seal and said outer shaft seal.

18. The assembly of claim 17, wherein said inner shaft seal comprises a circumferential carbon seal.

19. The assembly of claim 17, wherein said inner shaft seal runs on an inner shaft runner mounted on said low pressure turbine shaft.

20. The assembly of claim 19, wherein an inner seal interface between said inner shaft seal and said inner shaft runner has a coating material.

21. The assembly of claim 20, wherein said coating material comprises chrome.

22. The assembly of claim 17, wherein said inner shaft seal and said outer shaft seal are mounted on a bearing support housing of said aircraft engine.

23. The assembly of claim 17, wherein said inner shaft seal and said outer shaft seal have an initial built radial clearance of less than about 0.005 inches.

24. An assembly for sealing a forward end of an annulus between an inner shaft and an outer shaft comprising:

an inner shaft seal running on an outer diameter of said inner shaft;

an outer shaft seal running on an outer diameter of said outer shaft; and a buffer air flow fed into a cavity between said inner shaft seal and said outer shaft seal.

25. The assembly of claim 24, wherein said inner shaft seal and said outer shaft seal each comprise a circumferential carbon seal.

26. The assembly of claim 24, wherein said inner shaft seal has an initial built radial clearance of less than about 0.005 inches.

27. The assembly of claim 24, wherein said buffer air flow comprises an engine air flow.

28. An assembly for an annulus between an inner shaft and an outer shaft comprising:

an entrance seal having a first circumferential carbon seal and a second circumferential carbon seal, said entrance seal having an initial built radial clearance of less than about 0.005 inches, said first circumferential carbon seal running on an outer diameter of said inner shaft and positioned towards a forward end of said annulus, said second circumferential carbon seal running on an outer diameter of said outer shaft and positioned towards said forward end;

a labyrinth seal positioned on said outer diameter of said inner shaft and towards an aft end of said annulus, said labyrinth seal having an initial built radial clearance of between about 0.002 inches and about 0.020 inches;

a groove positioned on said inner diameter of said outer shaft and radially outward from said labyrinth seal, said groove filled with a silver material having a radial thickness of between about 0.005 inches and about 0.040 inches; and a buffer air flow fed into a cavity between said first circumferential carbon seal and said second circumferential carbon seal.

29. A method of purging oil from an annulus between an inner and an outer shaft comprising the steps of:

feeding a buffer airflow into a cavity at an entrance seal of said annulus, wherein said entrance seal comprises two circumferential carbon seals wherein one said circumferential carbon seal runs on an outer diameter of said inner shaft and one said circumferential carbon seal runs on an outer diameter of said outer shaft; and restricting the buffer air flow at the exit end of said annulus.

30. The method of claim 29, wherein said step of feeding the buffer air flow comprises feeding an external air flow between said two circumferential carbon seals.

31. The method of claim 29, wherein said step of feeding the buffer air flow comprises feeding an engine air flow.

32. The method of claim 29, wherein said step of restricting the buffer air flow comprises forcing the buffer air flow through a labyrinth seal positioned on the outer diameter of said inner shaft.

33. The method of claim 29, wherein said step of restricting the buffer air flow comprises forcing the buffer air flow between an exit seal on said inner shaft and an abradable material filled groove on said outer shaft.

* * * * *